June 23, 1931.          J. B. NEEVEL          1,811,825
PLANETARIUM
Filed May 25, 1928          2 Sheets-Sheet 1
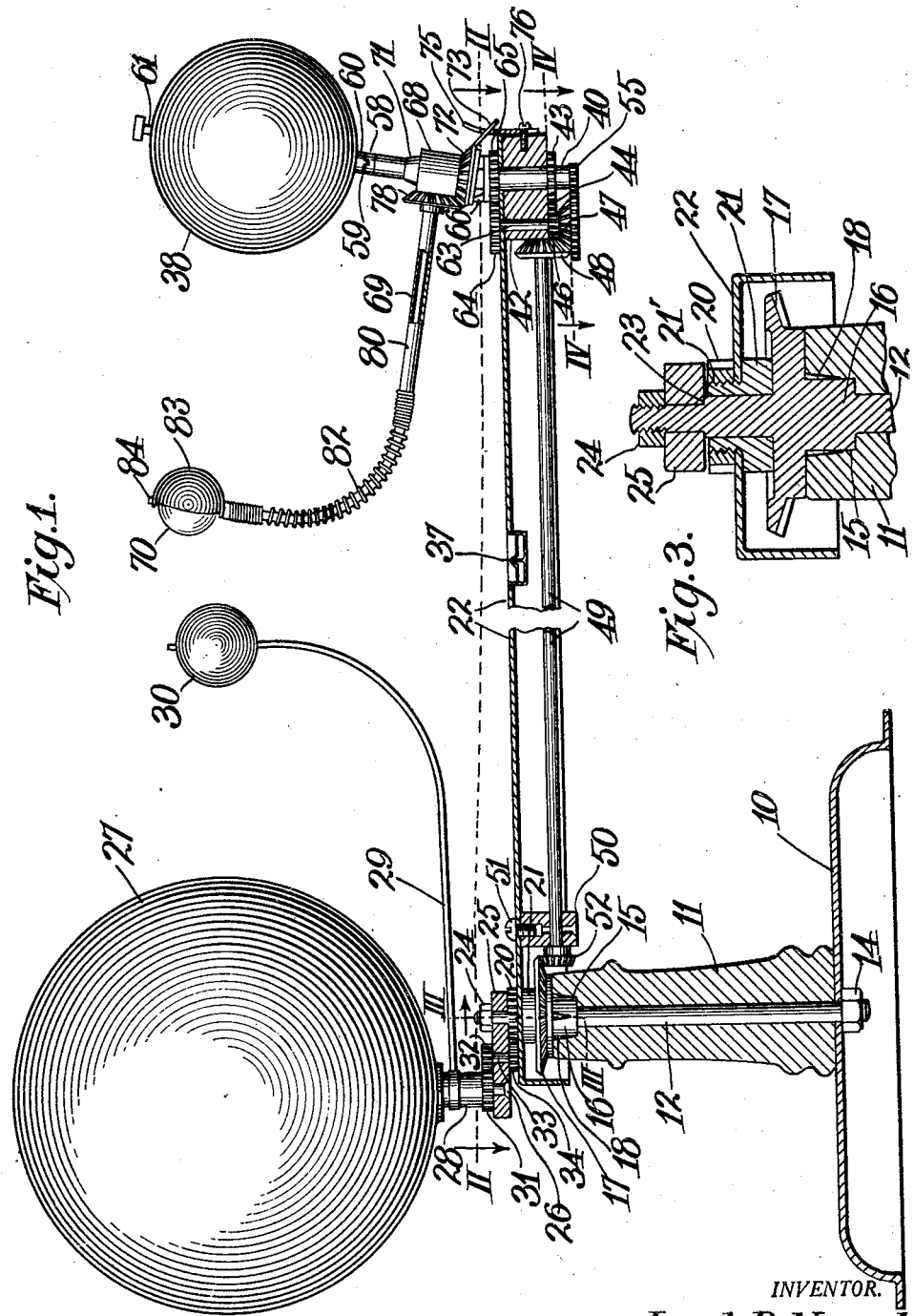
INVENTOR.
Jacob B. Neevel
BY Chas W. Gerard
ATTORNEY

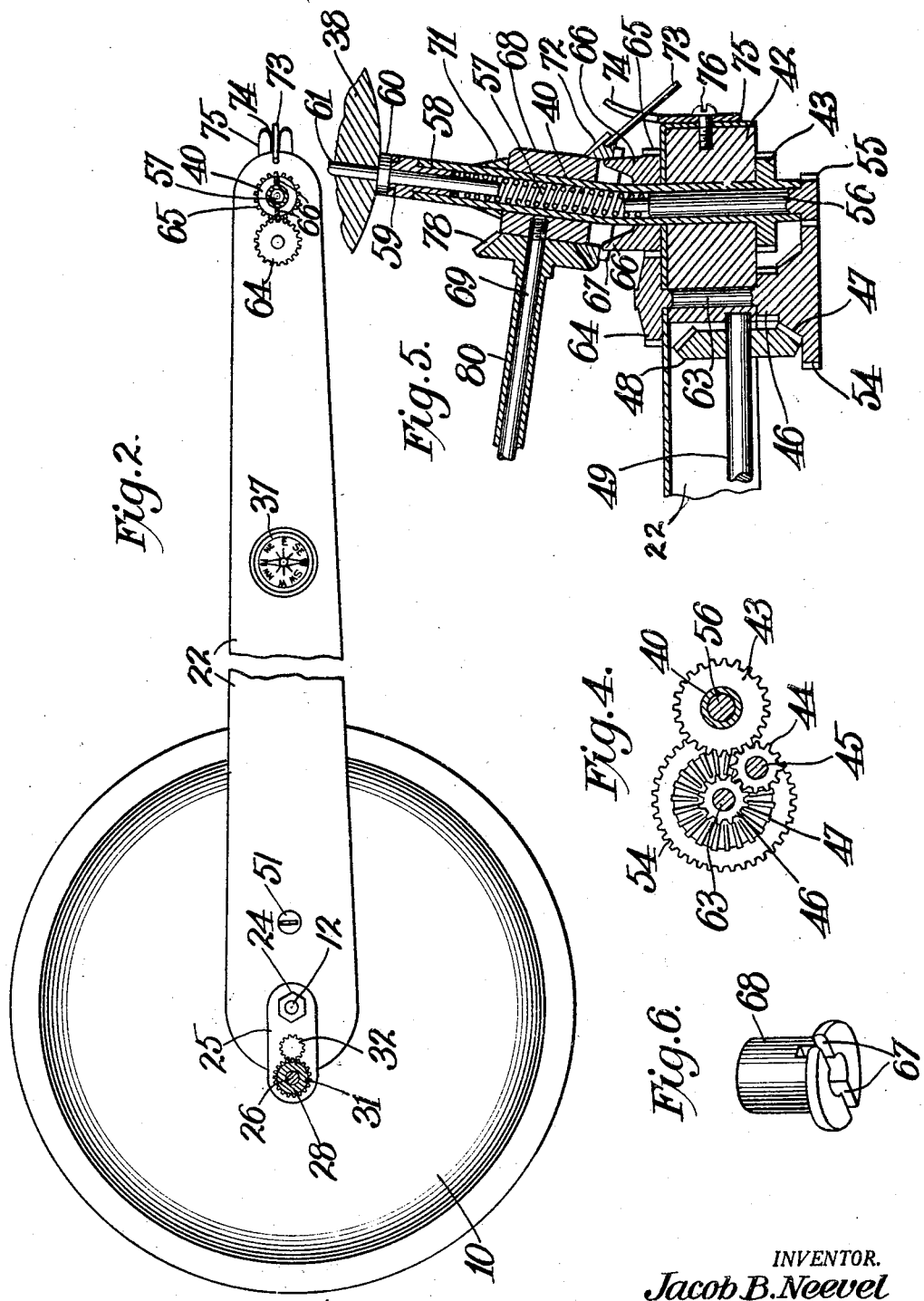

Patented June 23, 1931

1,811,825

UNITED STATES PATENT OFFICE

JACOB B. NEEVEL, OF KANSAS CITY, MISSOURI; MRS. JACOB B. NEEVEL, EXECUTRIX OF SAID JACOB B. NEEVEL, DECEASED, ASSIGNOR TO HARRY L. NEEVEL

PLANETARIUM

Application filed May 25, 1928. Serial No. 280,541.

The present invention relates to educational devices, with particular reference to planetariums designed to represent or simulate the movements of heavenly bodies, such as the movements of the planets about the sun in the solar system, as well as the movements of a satellite about one of the planets.

In the present construction, the object of the invention is to provide an instrument of this character whereby the movements of the earth as well as one of the other planets about the sun are simulated, provision being also made for representing the moon and its movements about the earth.

Accordingly, I have devised an improved construction in planetariums in which it is sought to simplify the principal, essential elements of the construction for expediting the manufacture of the same upon a commercial scale, certain of the improved features residing in the connections between the movable planet-carrying arm and the main supporting standard of the instrument.

It is also sought to provide various improved features for simplifying the construction of the gear assembly at the outer end of the planet-carrying arm as provided for actuating the earth and moon representing bodies of the device.

With the foregoing general objects in view, and other minor objects as will hereinafter appear, the invention will now be described by reference to the accompanying drawings illustrating one form of embodiment of the proposed improvements, after which those features deemed to be novel will be particularly set forth and claimed.

In the drawings—

Figure 1 is a vertical sectional elevation, with parts broken away, illustrating a planetarium embodying the present features of improvement;

Figure 2 is a sectional plan view, also partly broken away, and representing a section on the line II—II of Figure 1;

Figure 3 is an enlarged detail section, showing a section on the line III—III of Figure 1;

Figure 4 is a similar detail section, showing a section on the line IV—IV of Figure 1;

Figure 5 is an enlarged detail sectional view of the gear assembly at the outer end of the planet-carrying arm; and Figure 6 is a perspective view showing one of the moon actuating gear elements, hereinafter referred to.

Referring now to the drawings in detail, these illustrate the improved construction as comprising a base member 10 for the principal supporting standard, which includes the standard 11 centrally bored for a spindle bolt 12 the lower end of which is adapted to be secured by means of a nut 14 to the base member 10 as illustrated in Figure 1. The upper end of the standard 11 is counterbored as indicated at 15 for receiving the hub portion 16 of a bevel gear 17 which is preferably cast rigid with the bolt 12, the hub 16 being also cast with ribs or fins 18 adapted to be embedded in the walls of the counterbore or recess 16 and thereby maintain the gear in fixed, non-rotative relation to the standard 11.

Journaled upon the bolt spindle 12 above the bevel gear 17 is a combination gear 20 and bearing element 21 which cooperate to mount the planet-carrying arm 22 for rotative movement about the axis of the bolt 12, said arm being provided near one of its ends with an opening for the threaded shank portion 21' of the element 21, and the gear element 20 being correspondingly threaded to fit said shank 21' for securely clamping the arm 22 as illustrated in Figure 3.

Above the gear element 20, the bolt 12 is formed with a shoulder 23 against which is rigidly clamped, as by means of the nut 24, one end of a bar 25, the other end of which carries a vertical spindle 26 for supporting the sun representing body 27 in fixed relation to the standard 11.

Journaled upon this spindle 26 is also a sleeve member 28 to which is secured an arm 29 turned into upwardly projecting position as represented in Figure 1, for supporting a suitable planet body 30, representing one of the planets, such as Venus or Mercury, intermediate the earth and sun. The lower end of the sleeve 28 is formed with a gear 31 meshing with a pinion 32 on the upper end of a short stub shaft 33 journaled in the intermediate portion of the bar 25, the lower end of said stub shaft 33 being also provided with a pinion 34 which meshes with the gear element 20 whereby it is evident that, as the arm 22 is rotated about the axis of the bolt 12, a corresponding movement, but of smaller amplitude, will be imparted to the sleeve 28 and arm 29, for moving the planet body 30 in simulation of the planet which it represents.

The planet-carrying arm 22 is stamped from suitable metallic material, such as aluminum, and intermediate its ends may be provided with a suitable compass element 37 whereby the arm 20 may be appropriately set in its initial position with the axis of the earth inclined in proper north-pointing position. The earth representing body 38 is carried at the upper end of an angular tubular stem 40, the lower or vertical portion of which is journaled in the free end of the arm 22 and a block 42 fitted in the said free end of the arm 22, as represented in Figure 5. The lower end of the stem 40 is provided with a gear element 43 meshing with a pinion 44 journaled on a stud 45 carried by the underface of the block 42, the pinion 44 in turn meshing with gear teeth 46 provided on the upper portion of a combination gear which includes bevel gear teeth 47 meshing with a bevel pinion 48 fixed to the adjacent end of a shaft 49, which is journaled in the adjacent face of the box 42. The other end of this shaft is journaled in a suitable block 50 suspended by a screw 51 within the opposite end of the arm 22, where the shaft is also provided with a bevel pinion 52 meshing with the fixed bevel gear 17 as shown in Figure 1.

The combination gear above referred to as having the gear teeth 46 and 47 also includes gear teeth 54 meshing with a pinion 55 at the lower end of a flexible earth rotating shaft including the shaft section 56 in the vertical portion of the tubular stem 40, and the flexible portion 57 in the inclined portion of said member 40 and connecting with a short sleeve element 58 fitted in the upper end of the stem 40 and in turn connected by a clutch tooth and recesses (as indicated at 59) with a collar element 60 carried by the earth ball 38 which is slidingly mounted on the spindle 61, said clutch connection permitting the correct positioning of the earth ball 38 with reference to its axis on starting of the operation of the device.

The vertical shaft 63 journaled in the block 42 and carrying the combination gear device 46—47—54 above referred to has also secured to its upper end a gear 64 meshing with another gear element 65 journaled upon the stem 40 and resting upon the upper face of the arm 22, this element 65 being provided with a pair of spurs 66 adapted to engage a pair of recesses 67 formed in the lower end of a sleeve 68 which is journaled on the inclined portion of the stem 40 and has secured thereto an angular arm 69 the upturned portion of which carries a moon representing body 70. The gearing including the elements 64 and 65 thus imparts the necessary movement to the arm 69 and ball 70 for representing the movement of the moon about the earth, while the spurs 67 and recesses 68 provide in effect a universal joint permitting the oscillation of the moon carrying arm 69 owing to the angularity of the upper portion of the stem 40. A collar 71 is press fitted upon the stem 40 against the upper end of the sleeve 68 to limit its upward movement.

Upon the sleeve 68 is also fitted a bevel ring gear 72 having a tail piece 73 extending through a slot 74 in a forked bracket 75 secured by a screw 76 to the end of the arm 22, this gear 72 meshing with a bevel gear 78 secured to one end of a sleeve 80 mounted upon the straight portion of the arm 69 and connected by a coil spring 82 on the curved portion of said arm with a hemispherical shell 83 suitably mounted, as by means of a pintle 84, for rotation about the moon globe 70 in response to the action of the gears 72 and 78, as will be readily understood. The movement of the tail piece 73 within the slot 74 also is required for maintaining the bevel gear 72 in relatively fixed relation throughout the movement of the angular stem 40 as the latter rotates about the axis of the gear 43.

The operation of the instrument is carried out in all essential respects in the same manner as characterizes all devices in this same general class. The standard 11 is maintained stationary, and the arm 22 rotated about the axis of the standard which in turn causes the Venus or Mercury representing globe 30 to be carried about the axis of the sun 27 as represented by the spindle 26, due to the action of the gears 31, 32, 34 and 20. Simultaneously, the shaft 49 is rotated through the gears 17 and 52, thereby actuating the gear mechanism at the free end of the arm 22, and as above explained, effecting the movements of the globes 38 and 70 for simulating the rotation of the earth and moon respectively, and also maintaining the axis of the earth in fixed north-pointing position, due to the action of the gears 43, 44 and 47. The hemispherical shell 83 is colored dark, to simulate the shadow of the moon, and the action of the gears 72 and 78 produces the necessary movement of the shell 83 to maintain it always on the opposite side of the moon body 70 from the sun. During the travel of the arm 22 about the axis of the bolt 12, the path of the globe 38 represents of course the movement of the earth in its travel about the sun, and the bar 25 provides for the eccentricity of the earth's orbit, and hence resulting in the earth traveling nearer to the sun during that part of its orbit representing perihelion.

The arrangement of the gears at the outer end of the arm 22 provides for a maximum of simplicity, involving only two vertical shafts and a minimum number of parts connecting the gears with the axes of the earth and moon bodies while permitting the required shifting of the angular earth supporting stem 40 for maintaining its fixed angular relation with reference to the plane of its orbit.

It will thus be apparent that I have devised a practical, simple, and highly efficient arrangement and construction for carrying out all the desired objects of my invention, and while I have illustrated what I now regard as the preferred form of such construction I desire to be understood as reserving the right to make all such changes or modifications as may fairly fall within the scope of the appended claims.

Having thus described my invention, what I claim and desire to secure by Letters Patent is:

1. A planetarium instrument comprising an upright standard provided at its upper end with a fixed gear and a vertical spindle projecting above said gear, a sun body provided with an arm connected with the upper end of said spindle, a planet carrying arm provided with actuating mechanism driven from said gear, a combination gear and clamping element securing one end of said second arm for rotative movement about said spindle intermediate said fixed gear and first arm, and a second planet carrying arm provided with gearing driven from said combination gear element.

2. In a planetarium, an upright standard, a fixed vertical spindle carried by said standard, a planet carrying arm provided with a combination gear and clamping device rotatively securing said arm to said spindle for movement about the axis thereof, and a second planet carrying arm actuated by the gear portion of said combination device.

3. In a planetarium, an upright standard, a vertical spindle bolt formed with a bevel gear having a hub portion and anchoring fins all cast integrally with said spindle bolt, said hub portion and anchoring fins being embedded in the top of said standard, a planet-carrying arm provided with actuating means driven from said gear and also provided with means for rotatively securing said arm to the upper end portion of said spindle bolt for movement about the vertical axis thereof, and a second arm fixedly secured to the upper end of said bolt and carrying planet-actuating means operating in response to the movements of said first arm about said vertical axis.

In witness whereof I hereunto affix my signature.

JACOB B. NEEVEL.